United States Patent Office 2,810,695
Patented Oct. 22, 1957

2,810,695

LUBRICATING GREASE COMPOSITIONS CONTAINING POLYETHYLENE

David W. Young, Westfield, Arnold J. Morway, Rahway, and Andrew F. Sayko, Westfield, N. J., assignors to Esso Research and Engineering Company, a corporation of Delaware No Drawing. Application April 7, 1954, Serial No. 421,686

10 Claims. (Cl. 252—32)

This invention relates to lubricating grease compositions and to methods for their manufacture. Particularly the invention relates to lubricating grease compositions having outstanding structural stability that are prepared by thickening a lubricating oil to a grease consistency with a mixture of polyethylenes which may or may not contain a common grease forming soap.

For certain lubricating purposes lubricating grease compositions which have outstanding structural stability are essential. In those applications where a lubricating grease is subjected to high rates of shear a grease that does not have the ability to withstand these high shearing rates will break down and will not furnish satisfactory lubrication. In these applications lubricating greases often have been found to lose their grease-like structure, resulting in a separation of the soap from the oil, thus causing, in many instances, failure of the metal parts being lubricated.

In the prior art, various methods of preparing lubricating grease compositions having good structural characteristics have been disclosed. In general, the prior art teaches that high dropping points and a high degree of structural stability are obtained by the utilization of a high soap content in the grease formulation. For some applications, however, it would be desirable to be able to use a grease composition having lower soap contents. From an economic viewpoint, a lubricating grease that has these desirable properties with a lesser amount of soap would be desirable since, in general, the soap forming constituent of the grease is the most expensive item.

It has now been found and forms the object of this invention that lubricating grease compositions having a high degree of structural stability and high dropping points may be prepared by thickening a lubricating oil with a mixture of high molecular weight linear toluene soluble polyethylene resin and high molecular weight cross-linked toluene insoluble polyethylene resin. If desired, there may be also incorporated into the lubricating grease formation minor amounts of the commonly known grease forming soaps or other grease thickeners such as silica gels, diatomaceous earths, bentonites, the various N-acyl-p-aminophenols such as N-stearoyl p-aminophenol or mixtures of the above.

The gist of the instant invention is in the mixture of polyethylene resins employed as the major components of the grease thickener. As was stated above, this mixture of resins comprises a mixture of a linear, toluene-soluble polyethylene resin with a cross-linked toluene-insoluble polyethylene resin.

The polyethylene resins used in the formation of this mixture are known in the art. Techniques for the polymerization of ethylene into its various resinous compounds are known. One such technique is described in detail in U. S. Patent #2,153,553, issued April 11, 1939, to Fawcett et al. In general, the formation of the polyethylene resin is accomplished by subjecting ethylene to temperatures of about 200° to 600° C. and pressures in the order of 200 atmospheres or above. During the formation of these polyethylene resins there occurs a certain amount of cross linking of polymer chains which results in a hard, horny material as a by-product. This hard, horny resinous component has been heretofore rejected as a by-product and termed "reactor foulings." According to the technique set out below, however, this material is utilized in the preparation of lubricating greases of outstanding utility.

A comparison of the properties of the cross linked polymer and the linear polymer is shown in the table below.

PROPERTIES[1] OF CROSS LINKED POLYETHYLENE VS LINEAR POLYETHYLENE

| | Cross Linked Polyethylene[2] | Linear Polyethylene | | |
|---|---|---|---|---|
| M. Wt. | Not Determined | 10,000 | 20,000 | 30,000 |
| Swell Index at 25° C. in Trichloroethylene, percent | 4.8 | 36 | 28 | 19 |
| Cutting Resistance, Pounds at 25° C | 190 | 28 | 80 | 110 |
| Tensile Strength, p. s. i. at 25° C., ASTM–D412 | 6,280 | 1,100 | 2,100 | 2,900 |

[1] Test procedures described by A. E. Maibauer and C. S. Myers, Transactions of the Electrochemical Society, vol. 90, 1946, pages 341 to 359.

[2] Cross-linked polymer was accumulated on the reactor walls over a period of time during which seven polymerizations were made at pressures ranging from 3,500 p. s. i. g. to 5,000 p. s. i. g. and with the reactor temperature varying between 135° C. and 165° C. Ethylene feed stock purity was between 65% and 95%. Di-tertiary butyl peroxide catalyst was employed. All polymerizations were conducted in a benzene medium. Insoluble gel of 81.5% was determined with xylene reflux in an extraction unit.

The linear toluene-soluble polyethylene resins that are operable in the concept of this invention have molecular weights of above about 6,000 to 25,000 Staudinger. Toluene soluble polyethylene resins having molecular weights within the range of about 18,000 to 22,000 are particularly desirable.

The mixture of toluene-soluble and toluene-insoluble polyethylene resins contemplated in this invention contains from about 10 to about 25 weight percent of the toluene-soluble resins to about 75 to 95% of the toluene-insoluble resins. Especially preferred are mixtures containing from 15 to 25 weight percent of the toluene soluble resin and 75 to 85 weight percent of the toluene insoluble resin.

The amount of the total mixture that is utilized in formulating the grease compositions of this invention are dependent upon the characteristics desired in the final product. Ordinarily, however, there will be incorporated into the lubricating oil base from about 5% to about 10% by weight of the mixture of resins. In some instances it may be desirable to mix the toluene-soluble resin with the toluene-insoluble resin prior to incorporating the mixture into a lubricating oil base. In this instance, the mixing is best accomplished by milling at elevated temperatures on a roller mill such as a paint mill or the like until a homogeneous mixture is obtained. This prior mixing, however, is not essential and the solid materials may be blended with the lubricating oil base and dissolved in the oil by the application of heat with stirring.

If it is desired to incorporate a common grease forming soap with the mixture of resins as described above any of the metallic soaps of high molecular weight fatty acids may be used. Among the operable metals may be mentioned the alkali metals, sodium, lithium, potassium, as well as the alkaline earth metals, calcium, barium, strontium and magnesium. The fatty acids may be selected from a large variety of the well known grease making materials such as stearic acid, hydroxy stearic acid, oleic acid, hydrogenated fish oil acids, vegetable fat, tallow, glycerides, either saturated or unsaturated, or mixtures of the above. The amount of the soap constituent in the blends will again depend on the final product characteristics desired. As little as 2% or as much as 20% of the soap may be blended with the desired amount of the mixture of polyethylene resins in preparing grease compositions in accordance with the inventive concept. Complex soap-salt mixtures such as the sodium soap prepared by the high temperature saponification of rapeseed oil or mixtures of low molecular weight salts such as acetates and high molecular weight soaps may also be used.

The lubricating oil which is used as a base for the formulation of the greases of this invention may be any of the lubricating oils known to the art, whether naturally occurring or synthetic. Petroleum distillates from either naphthenic or paraffinic base stocks or mixtures of these may be used. Synthetic lubricants such as diesters, complex esters, formals, carbonates, polyethers, polyglycol ethers, polyglycol ether esters, etc., may be used. It is generally preferred that the lubricating oil base stock chosen should have viscosities at 210° F. within the range of about 35 to 300 SUS with viscosities at 210° F. of 40 to 150 SUS being especially preferred.

The grease formulations prepared in accordance with this invention may include various additive materials for improving special properties. These novel grease compositions are compatible with tackiness agents, oxidation inhibitors, color agents, extreme pressure additives and the like.

The invention will be more clearly explained by reference to the following examples, which are illustrative only.

Example 1

A linear type polyethylene of a molecular weight of 20,000 Staudinger that was completely soluble in toluene was blended in a 10 wt. percent blend with a synthetic lubricating oil. The synthetic lubricant had a viscosity at 210° F. of 58 SUS, a viscosity index of 155 and an ASTM pour point of −75° F. The mixture was heated with stirring to a temperature of 350° F. At this temperature, the polyethylene went into solution in the synthetic oil. Upon cooling a smooth unctuous grease composition was obtained. This grease composition had the following inspections:

ASTM penetration values (77° F., mm./10):
 Unworked _____ 285
 Worked (60 strokes)_____ 300
ASTM dropping point _____° F__ 160

Example 2

Example 1 was repeated using instead of the linear toluene-soluble polyethylene, a cross-linked toluene-insoluble polyethylene that contained approximately 60% gel. The resulting composition was poor in structure and was very lumpy in appearance. It gave no meaningful inspection values.

Example 3

A blend of 50 wt. percent of the linear toluene-soluble polyethylene used in Example 1 with 50 wt. percent of a toluene-insoluble, cross-linked polyethylene used in Example 2 was milled for 10 minutes on a hot roll mill at 240° F. The product obtained was then blended in 10 wt. percent with the same synthetic oil as used in Example 1 by stirring to 350° F. On cooling an excellent appearing grease composition was obtained that had the following inspections:

ASTM penetration values (77° F., mm./10):
 Unworked _____ 260
 Worked (60 strokes)_____ 280
 Worked (100,000 strokes)_____ 305
ASTM dropping point _____° F__ 254

Example 4

FORMULATION 2.50 wt. percent of cross-linked, toluene-insoluble polyethylene
7.50 wt. percent of linear toluene-soluble polyethylene (20,000 m. wt.)
90.00 wt. percent mineral oil of a viscosity at 210° F. of 55 SUS

PROCEDURE

The small solid particles of polyethylene were heated in the mineral oil with stirring at 375° F. After about ½ hour the solid material was completely in solution and was then cooled to room temperature. The mixture was then homogenized at high rates of shear under conditions of streamlined flow in a Gaulin homogenizer. An excellent appearing grease composition was obtained having the following inspections:

ASTM penetration values (mm./10, 77° F.):
 Unworked _____ 300
 Worked (60 strokes)_____ 320
 Worked (100,000 strokes)_____ 320
ASTM dropping point _____° F__ 245
Water solubility (212° F.) _____ Insoluble

Example 5

FORMULATION 75 wt. percent of grease of Example 4
25 wt. percent preformed calcium stearate grease of No. 2 Grade (NLGI)

PROCEDURE

The mixture of greases was passed through the Gaulin homogenizer. A grease composition of excellent appearance was obtained which had the following inspections:

ASTM penetration values (mm./10, 77° F.):
 Unworked _____ 275
 Worked (60 strokes) _____ 285
 Worked (100,000 strokes) _____ 290
ASTM dropping point _____° F__ 185
Water solubility (212° F.) _____ Insoluble

Example 6

FORMULATION 2.0 wt. percent N-stearoyl-p-aminophenol
2.5 wt. percent polyethylene (20,000 molecular weight)
95.00 wt. percent mineral lubricating oil (55 SUS/210° F.)
0.5 percent phenol alpha-naphthylamine

PROCEDURE

The polyethylene resin, the N-stearoyl p-aminophenol and the mineral oil were charged to a grease kettle and heated with stirring to 275° F. After 30 minutes at this temperature, the polyethylene was completely dispersed. The phenol alpha-naphthylamine was then added. On rapid cooling, a solid unctuous lubricating grease was formed with an excellent uniform appearance. This grease composition had the following inspections:

ASTM penetration value (mm./10, 77° F.):
 Unworked _____ 285
 Worked (60 strokes) _____ 295
 Worked (10,000 strokes) _____ 300
ASTM dropping point _____ 225
Water washing test _____ No loss
Ash, percent _____ 0
Lubrication BEC test:
 80° F.
 150° F.   } Excellent lubrication. No tendency to leak through seal.
 200° F.

To summarize briefly, this invention relates to novel lubricating grease compositions having outstanding structural stability which are prepared by thickening a lubricating oil to a grease consistency with a mixture of a linear toluene-soluble polyethylene resin, having a molecular weight between about 6,000 and 25,000 Staudinger with a cross-linked toluene-insoluble polyethylene resin. If desired, the grease formulation may include any of the common grease forming soaps or other grease forming materials such as the N-acyl p-aminophenols containing from about 8 to about 18 carbon atoms in the acyl group as well as inorganic thickeners such as silica gel, bentonite and the like.

What is claimed is:

1. A lubricating grease composition which comprises a lubricating oil thickened to a grease consistency with a mixture of a linear, toluene-soluble polyethylene having a molecular weight of from about 6,000 to 25,000 Staudinger and a cross-linked, toluene-insoluble polyethylene, said mixture containing from about 10 to 50% of the cross-linked polyethylene.

2. A lubricating grease composition which comprises a lubricating oil thickened to a grease consistency with from 10 to 50 wt. percent of a mixture of from 50 to 90 wt. percent of a linear toluene-soluble polyethylene of a molecular weight within a range of from 6,000 to 25,000 with from 50 to 10 wt. percent of a cross-linked, toluene-insoluble polyethylene.

3. A lubricating grease composition according to claim 2 wherein said lubricating oil is a synthetic oil.

4. A grease composition according to claim 2 wherein said lubricating oil is a mineral oil.

5. A grease composition according to claim 2 wherein said toluene-soluble polyethylene has a molecular weight of about 20,000.

6. A lubricating grease composition according to claim 2 containing from 2% to 20% by weight of a grease-forming metal soap of a high molecular weight fatty acid.

7. A process for the preparation of lubricating grease compositions which comprises adding 10 to 50 wt. percent of polyethylene to a lubricating oil, said polyethylene consisting of 50 to 90 wt. percent of a linear toluene-soluble polyethylene having a molecular weight within the range of from 6,000 to 25,000 with 50 to 10 wt. percent of a cross-linked toluene-insoluble polyethylene resin, heating the oil-polyethylene mixture with stirring to a temperature sufficient to melt and disperse the mixture of polyethylene resins in said oil and cooling said heated dispersion to obtain a finished grease composition.

8. A process for the preparation of lubricating grease compositions which comprises the steps of forming a homogeneous mixture of from 50 to 90 wt. percent of a linear, toluene-soluble polyethylene having a molecular weight within the range of from 6,000 to 25,000 Staudinger with from 10 to 50 wt. percent of a cross-linked, toluene-insoluble polyethylene, blending from 5 to 40 wt. percent of said homogeneous mixture with a lubricating oil, heating the blend to a temperature within the range of from 300° to 400° F., and cooling said heated blend to obtain a finished grease composition.

9. A process according to claim 8 wherein said lubricating oil is a synthetic lubricating oil.

10. A process according to claim 8 wherein said lubricating oil is a mineral lubricating oil.

References Cited in the file of this patent

UNITED STATES PATENTS

| | | |
|---|---|---|
| 2,627,938 | Frohmader et al. | Feb. 10, 1953 |
| 2,628,187 | Frohmader et al. | Feb. 10, 1953 |
| 2,691,647 | Field et al. | Oct. 12, 1954 |
| 2,762,775 | Foehr | Sept. 11, 1956 |

FOREIGN PATENTS

| | | |
|---|---|---|
| 1,050,373 | France | Sept. 2, 1953 |